United States Patent
Firth

[15] 3,682,505
[45] Aug. 8, 1972

[54] MEANS FOR MOUNTING SHEAVES, ETC.

[72] Inventor: David Firth, 1441 E. Jefferson Blvd., South Bend, Ind. 46617

[22] Filed: Oct. 31, 1969

[21] Appl. No.: 872,942

[52] U.S. Cl. ............................................. 287/52.06
[51] Int. Cl. ................................................ F16d 1/06
[58] Field of Search ......... 287/52.06, 52.09, 52.04, 52

[56] References Cited

UNITED STATES PATENTS

| | | | |
|---|---|---|---|
| 2,295,314 | 9/1942 | Whitney | 85/1 SS |
| 2,402,743 | 6/1946 | Firth | 287/52 |
| 2,570,604 | 10/1951 | Siegerist | 287/52 |
| 2,571,699 | 10/1951 | Firth | 287/52.06 |
| 2,612,395 | 9/1952 | Russell | 287/52.06 |

FOREIGN PATENTS OR APPLICATIONS

| | | | |
|---|---|---|---|
| 736,395 | 9/1955 | Great Britain | 287/52.09 |

*Primary Examiner*—Andrew V. Kundrat
*Attorney*—Oltsch & Knoblock

[57] ABSTRACT

An improvement to a shaft-mountable unit including a hub having a tapered bore, a tapered split contractible bushing fitting therein and having a shaft bore. The hub and bushing are formed with confronting parts defining longitudinal screw holes each having a screw threaded wall in one of the hub and bushing and a thread-less wall in the other other of the hub and bushing. Each screw hole has an outer open end in the larger end of said other of the hub and bushing and the adjacent end of said one of the hub and bushing. A screw is turned into each hole in threaded engagement with said one of the hub and bushing. A shoulder is formed on said other of the hub and bushing with the screw being tightened thereagainst for wedging the bushing between the hub and a shaft. The improvement wherein said one of the hub and bushing defines at least in part a plurality of longitudinal bores formed within the unit. Each bore is aligned and in communication with a screw hole and has an outer open end in the opposite side of the unit from the outer open end of the screw hole aligned therewith. Each screw includes a socket or slotted portion at an end thereof for engagement with a driving tool which can be inserted into either the bore or the hole aligned therewith in order to tighten the screw from either side of the unit.

5 Claims, 5 Drawing Figures

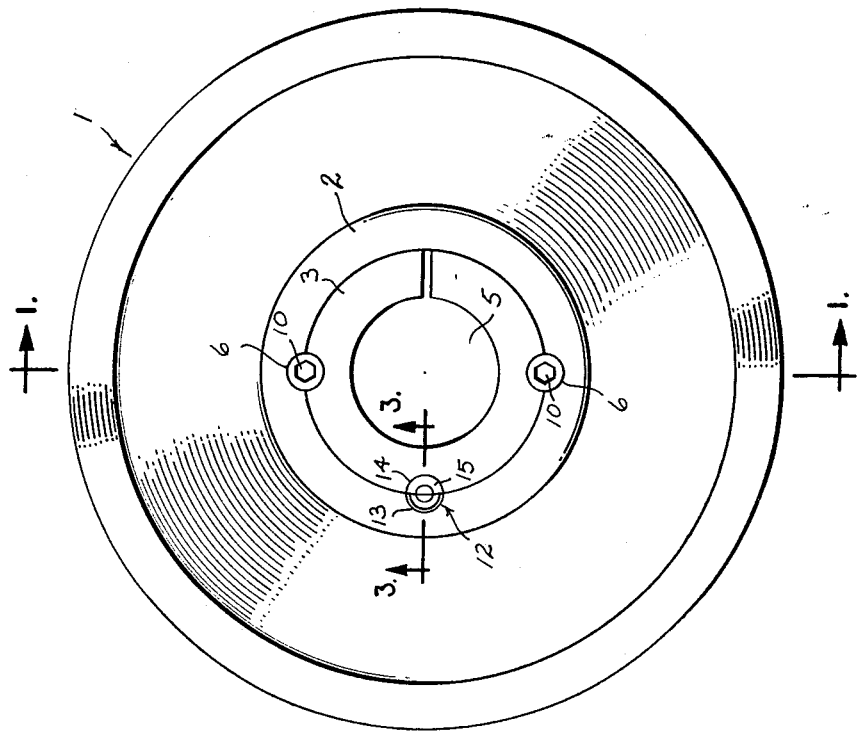
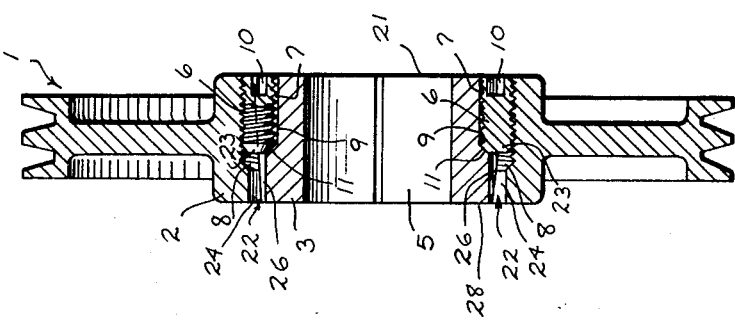
INVENTOR.
DAVID FIRTH
BY Oltsch & Knoblock
ATTORNEYS

INVENTOR.
DAVID FIRTH

ATTORNEYS

MEANS FOR MOUNTING SHEAVES, ETC.

BACKGROUND OF THE INVENTION

This invention relates to means for mounting sheaves, couplings, and similar devices and concerns specifically an improvement to my U.S. Pat. No. 2,402,743, granted June 25, 1946.

When utilizing the mounting means described in U.S. Pat. No. 2,402,743 in a coupling to join two aligned shafts in which oppositely positioned shaft receiving split bushings are wedged by screw means into interconnected hubs, there are occasions when the coupling is positioned so near a motor or bearing that it is extremely difficult and sometimes impossible to tighten the wedging screws adjacent the motor or bearing due to a lack of clearance between the motor or bearing and the coupling. This inconvenience may cause the user of the coupling to substitute a modified type of coupling half for that portion of the coupling located adjacent the motor. This same difficulty may be experienced in mounting a plurality of sheaves constructed in accordance with the teachings of U.S. Pat. No. 2,402,743 adjacent one another on a common shaft. In this situation the user of the sheaves must be certain that each sheave is positioned upon the shaft so that the heads of the wedging screws point outwardly in order to permit tightening of the wedging screws when the the sheave is in position.

My present invention eliminates these aforementioned difficulties and permits a shaft-mountable unit, such as a coupling or sheave, constructed in accordance with the teachings of U.S. Pat. No. 2,402,743 to be mounted to a shaft by having the wedging screws thereof tightened from either side of the unit.

SUMMARY OF THE INVENTION

This invention relates to an improvement to a shaft-mountable unit which includes a hub having a tapered bore and a tapered split contractable bushing fitting within said tapered bore and having a shaft bore formed therein. The hub and bushing are formed with confronting parts which define longitudinal screw holes each having a screw threaded wall in one of said hub and bushing and a threadless wall in the other of said hub and bushing. Each screw hole has an outer open end in the larger end of said other of the hub and bushing and in the adjacent end of said one of the hub and bushing. A screw is turned into each screw hole and threadably engages said one of the hub and bushing. A shoulder is formed on said other of the hub and bushing against which the screw can be tightened for wedging the bushing between the hub and a shaft received within the bore of the bushing.

The aforedescribed shaft-mountable unit has formed therein as an improvement a plurality of longitudinal bores, each of which is aligned and in communication with a screw hole and is defined at least in part by said one of the hub and bushing. Each bore has an outer open end in the opposite side of the unit from the outer open end of its aligned screw hole. Each screw includes means in at least one end thereof adapted for engagement with a driving tool and is insertable into its screw hole in such a manner so as to enable it to be turned from either side of the unit.

Accordingly, it is an object of this invention to provide a shaft-mountable unit, such as a sheave or a coupling, having screws utilized to effect the wedging of a tapered split bushing within a surrounding hub so as to cause the bushing to grip a shaft and secure the shaft to the hub and in which each screw may be tightened from either side of the shaft-mountable unit to enable the unit to be positioned adjacent a bearing or motor housing.

Another object of this invention is to provide a shaft-mountable unit which is of economical construction.

Other objects of this invention will become apparent upon a reading of the invention's description.

BRIEF DESCRIPTION OF THE DRAWINGS

FIG. 1 is a sectional view of one embodiment of a shaft-mountable unit taken along line 1—1 of FIG. 2.

FIG. 2 is an end elevation of the illustrated embodiment of the shaft-mountable unit.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 3:
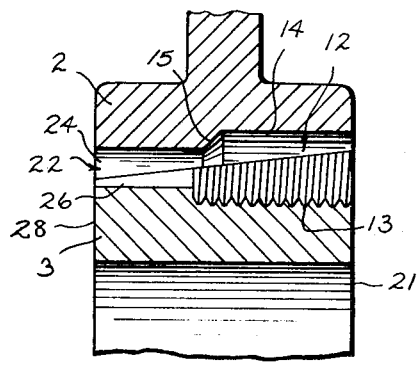
FIG. 3 is a fragmentary sectional view taken along line 3—3 of FIG. 2.

The shaft-mountable unit illustrated in FIGS. 1–3 includes a sheave 1 having a hub 2 which has a tapered bore therein. A tapered longitudinally split contractable bushing 3 is received within the bore of hub 2 and defines a bore 5 which is preferably of uniform diameter and which is adapted to enclose a shaft. Screws 6 are circumferentially spaced about the axis of the shaft-mountable unit and parallel the shaft with one part of each screw preferably engaged with one of hub 2 and bushing 3 and with the remaining part of the screw operatively connected to the other of the hub and the bushing. As illustrated in FIG. 1, each screw receiving hole 7 is defined by a female threaded portion 8 in hub 2 and a confronting unthreaded longitudinal groove portion 9 in bushing 3. Each screw hole 7 extends a substantial distance into the shaft-mountable unit and has an end which opens at the larger end 21 of bushing 3. Each screw 6 is of the headless type having a hexagonal shaped wrench socket 10 in one end. Groove portion 9 of each screw hole 7 includes an internal shoulder 11. Threaded portion 8 of each screw hole 7 extends inwardly into the shaft-mountable unit beyond the shoulder 11 of groove portion 9. The angle of taper of the bushing and the hub bore is preferably between 8° and 13° but may vary between 2° and 60°. A screw 6 is turned into each screw hole 7 threadably engaging threaded portion 8 thereof and abutting shoulder 11 so as to cause relative movement between hub part 2 and bushing 3 and constriction of the bushing about a shaft received within bore 5.

Referring now to FIGS. 2–3, at least one additional screw hole 12 may be formed in the shaft-mountable unit with parts thereof in the bushing and the hub. Hole 12 is of similar design as the screw holes 7 described relative to FIG. 1 with the exception that a screw threaded portion 13 is formed in the larger end 21 of bushing 3 and a confronting unthreaded longitudinal groove 14 of each hole 12 and a shoulder 15 are formed in hub 2. A screw 6 may be turned into screw hole 12 causing the innermost end thereof to abut shoulder 15 and the shifting of bushing 3 relative to hub 2 so as to cause disengagement of the bushing from the hub and the release of a shaft received within the bushing. A more complete description of the aforedescribed shaft-mountable unit and its manner of operation is found in U.S. Pat. No. 2,402,743.

Figure 4:
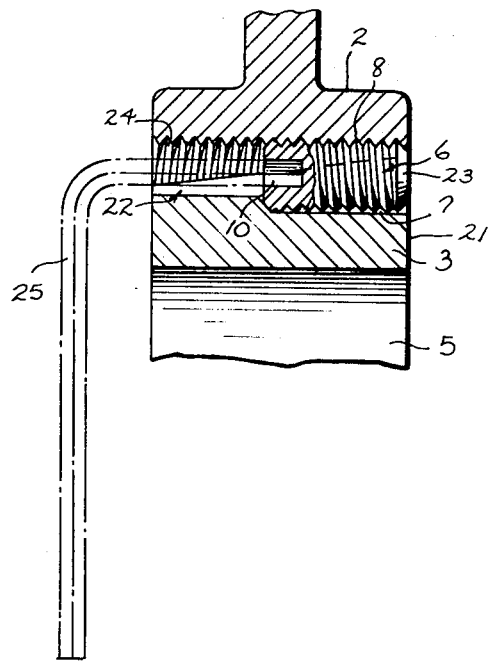
FIG. 4 is a fragmentary sectional view showing a wedging screw and cooperating hub and bushing parts of the illustrated embodiment in modified form.

This invention consists of an improvement to the shaft-mounted mounted unit heretofore described and illustrated in FIGS. 1–3, and comprises a plurality of bores 22 formed in the unit. Each bore 22 is aligned, preferably coaxially, with a screw hole 7,12 and in communication therewith, and is defined by part 24 of hub 2 and a confronting part 26 of bushing 3. Each bore 22 has an outer opening at end 28 of the shaft-mountable unit which is positioned on the opposite side of the unit from the outer openings of screw holes 7 and 12. It is to be understood that in some constructions of this invention each bore 22 may be wholly defined by the hub, depending upon the extent of penetration of the screw hole into the shaft-mountable unit and the taper of the hub and bushing thereof. FIG. 4 illustrates a modified form of bore 22 in which that part 24 of hub 2 defining bore 22 is threaded and is continuous with threaded portion 8 of the aligned screw hole 7.

The advantages of this invention can best be appreciated by comparing the orientation of screws 6 in FIGS. 1 and 4. In FIG. 1 the screws 6 are turned into screw holes 7 with sockets 10 thereof located adjacent larger end 21 of bushing 3 and the plain ends 23 of the screws located innermost in the unit. In FIG. 4 screws 6, only one shown, are turned into screw holes 7 with sockets 10 thereof located innermost in the unit, thereby enabling the unit user to turn screws 6 by means of a driving tool 25, illustrated in broken lines in FIG. 4 as a hex key or set screw wrench, inserted through bores 22. Thus the unit user can turn screws 6 from either side of the unit by selectively inserting each screw either socket end or plain end first into a screw hole 7 or 12.

Figure 5:
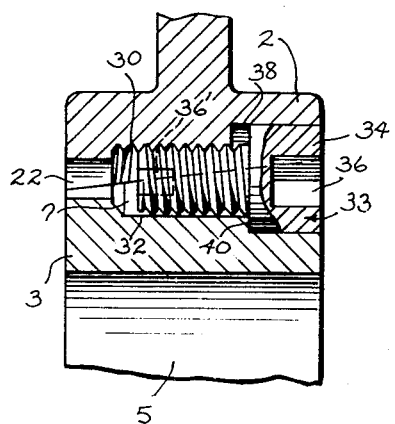
FIG. 5 is a fragmentary view showing a wedging screw and cooperating hub and bushing parts of the illustrated embodiment in another modified form.

Another application of my invention is illustrated in FIG. 5 in which screw hole 7 is defined by a female threaded portion 30 in hub 2 and a confronting unthreaded longitudinal groove portion 32 in bushing 3. Screw 33 is of the fillister-head type having a head 34 with a hexagonal-shaped wrench socket 36 therein. Each screw hole 7 may include a countersunk portion 38 which is formed partly in the hub and partly in the bushing, and which has a greater depth in the hub than in the bushing so as to provide a shoulder 40 against which the head 34 of each screw abuts as the screw is turned into the screw hole and threadably engaged with threaded portion 30 of the hub. As screws 33 are tightened by means of a driving tool, such as a hex key or set screw wrench, head 34 of each screw engages shoulder 40 of the bushing and causes hub 2 to be shifted relative to the bushing toward the larger end 21 thereof so as to cause the bushing to contract and grip a shaft received within bore 5 of the bushing. The threaded end of each screw 33 has a hexagonal-shaped wrench socket 36' formed therein. A bore 22 is aligned with each screw hole 7 as previously described. By having a wrench socket 36 and 36' formed in each end of screw 33, the user of the unit is able to turn the screw from either side of the unit.

It is to be understood that screws 7 and 33 may be slotted instead of socketed. Also, bores 22 in the unit may be the same diameter as screw holes 7,12 and therefore continuous with the screw holes.

What I claim is:

1. An element for a unit of the class described comprising a split contractible tapered bushing having a bore therethrough to fit a shaft of uniform diameter and formed with exterior longitudinal open-ended grooves part-circular in cross section and extending from one end to the other end of said bushing, certain of said grooves each having a screw-threaded wall portion and an end portion of lesser cross section than said screw-threaded wall portion and certain of said grooves each having a threadless wall portion and an end portion of lesser cross section than said threadless wall portion.

2. An element for a unit of the class described comprising a hub having a tapered bore and formed with interior longitudinal open-ended grooves part-circular in cross section and extending from one end to the other end of said hub, certain of said grooves each having a screw-threaded wall portion and an end portion of lesser cross section than said screw-threaded wall portion and certain of said grooves each having a threadless wall portion and an end portion of lesser cross section than said threadless wall portion.

3. In an element for a unit of the class described comprising a split contractible tapered bushing bored to fit a shaft of uniform diameter and adapted to fit within a tapered bore of a hub, said bushing formed with exterior longitudinal open-ended grooves part-circular in cross section, certain of said grooves having screw-threaded walls and each adapted to register with an unthreaded groove of said hub and certain of said grooves having threadless walls and each adapted to register with a threaded groove of said hub, the improvement wherein each of said bushing grooves has a reduced end portion at the smaller reduced end end of said bushing, each reduced groove end portion of said bushing being adapted to register with a similar reduced groove end portion in said hub to form a circular bore of such a diameter as to form a guide for a tool utilized to turn a screw disposed within registering hub and bushing grooves.

4. A hub section for a unit of the class described comprising a hub having a tapered bore for receiving a split contractible tapered bushing, said hub including interior longitudinal open-ended grooves part-circular in cross section, certain of said grooves having screw-threaded walls and each being adapted to register with an unthreaded groove of said bushing and certain of said grooves having threadless walls and each being adapted to register with a threaded groove of said bushing, the improvement wherein each of said hub grooves has a reduced cross sectional end portion at the end of said hub defining the minimum diameter of said hub bore, each reduced groove end portion of the hub being adapted to register with a similar reduced groove end portion in the bushing to form a circular bore of such a diameter as to form a guide for a tool utilized to turn a screw disposed within registering hub and bushing grooves.

5. A hub section for a unit of the class described comprising a hub having a tapered bore for receiving a split contractible tapered bushing, said hub including an interior longitudinal open-ended groove part-circular in cross section, said groove having screw-threaded walls and being adapted to register with an unthreaded groove of said bushing, the improvement wherein said hub groove has a reduced cross sectional end portion at the end of said hub defining the minimum diameter of said hub bore, the reduced groove end portion of the hub being adapted to register with a similar reduced groove end portion in the bushing to form a circular bore of such a diameter as to form a guide for a tool utilized to turn a screw disposed within the registering hub and bushing grooves.

* * * * *